Figure 1:
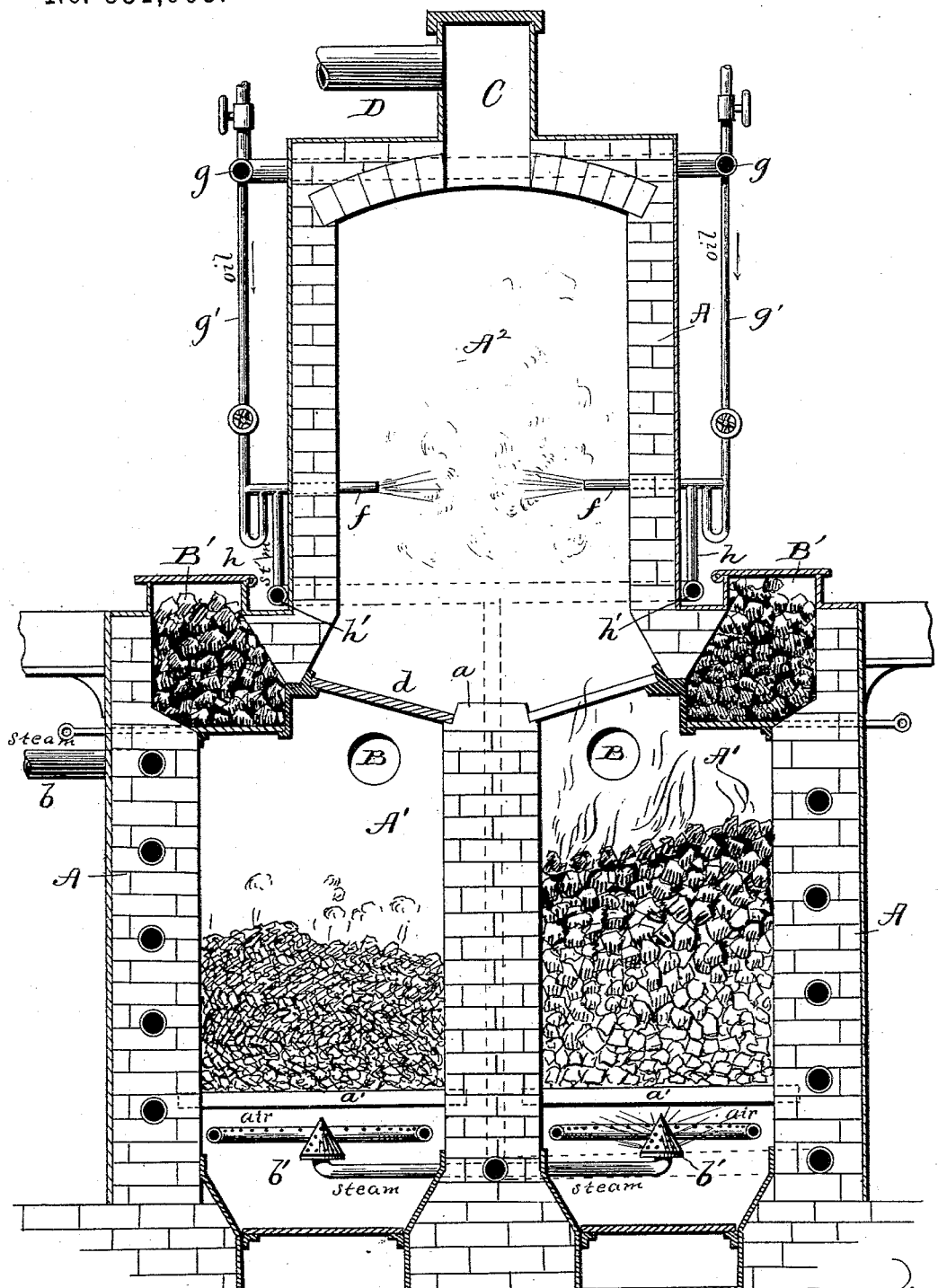

(No Model.)

J. W. MITCHELL.
PROCESS OF MANUFACTURING ILLUMINATING GAS.

No. 331,903. Patented Dec. 8, 1885.

UNITED STATES PATENT OFFICE.

JOHN W. MITCHELL, OF BAYONNE, NEW JERSEY.

PROCESS OF MANUFACTURING ILLUMINATING-GAS.

SPECIFICATION forming part of Letters Patent No. 331,903, dated December 8, 1885.

Application filed August 14, 1885. Serial No. 174,367. (No specimens.)

*To all whom it may concern:*

Be it known that I, JOHN W. MITCHELL, a citizen of the United States, residing at city of Bayonne, in the county of Hudson and State of New Jersey, have invented certain new and useful Improvements in Process of Manufacturing Illuminating-Gas; and I do hereby declare the following to be a full, clear, and exact description of the invention, such as will enable others skilled in the art to which it appertains to make and use the same.

My invention relates to an improved process for the manufacture of illuminating-gas, its object being to produce an illuminating-gas by decomposing steam in contact with incandescent fuel and uniting the resulting gas or gases with gas produced by the decomposition of crude petroleum or other hydrocarbon in a chamber of the furnace and while the water-gas is being produced, by which a permanent or fixed gas of any desired illuminating power may be produced by the heating properties of the former.

My invention consists in generating hydrogen and carbonic oxide (water-gas) by, first, bringing a body of fuel to incandescence in a suitable furnace, permitting the primary products of combustion to escape, (or utilizing the same as fuel meanwhile;) second closing the purging-conduit and at the same time admitting currents of superheated steam and air to the fuel, so regulated in relative volume as to maintain the proper degree of heat and continue combustion; third, passing the gas as produced to a dome-chamber of the furnace, and there intercept the same by injecting superheated steam and crude petroleum to said dome or chamber in such regulated quantity as to maintain the temperature therein at about 1600°; and, fourth, passing the resultant or combined gases through purifying apparatus where the injurious excess of nitrogen is removed by conversion into ammoniacal compounds, and thence to the holder, whereby I obtain an illuminating-gas by a continuous process in a very simple apparatus.

In carrying out my invention I first charge a close cupola furnace or retort of any suitable form or construction with fuel, preferably anthracite coal, and bring it to incandescence by internal combustion, permitting the first products of combustion to pass off through a purging-flue to the atmosphere or to another furnace where they are used as a fuel element. I then close the purging-flue, and at the same time admit currents of superheated steam and air, and force them into and through the incandescent fuel. The volume of air admitted must bear such proportion to the volume of steam, and the requirements of combustion taking place within the cupola, as will be capable of supporting combustion and of overcoming the extinguishing effect of the decomposition of superheated steam, whereby the required temperature of the furnace will be rendered constant and uniform. The steam, air, and fuel combine and form a highly combustible gas. Upon the quantity or magnitude of the incandescent fuel, together with the relative volume of steam and air passed through the same, will depend and regulate the degree of heat in the furnace and in the decomposing and fixing chamber above the same, which should be fully 1600°. While the water-gas is being generated I cause to be introduced, by means of a jet of superheated steam through suitable injectors, a regulated quantity of steam and crude petroleum or other hydrocarbon sufficient to produce luminous volume, and also preserve the temperature in the dome or chamber at about 1600°, to carburet and enrich the entire volume of gas, so as to insure the desired standard of illuminating-power. By this process the hydrocarbon and steam is decomposed and converted into a fixed gas, and thoroughly amalgamated with the water-gas. The resultant gases are then conducted through a water-seal to purifiers of any approved character for removing the excess of nitrogen, the carbonic acid, and the sulphureted hydrogen and other impurities, and thence to the holder. The resistance of the water-seal to retard the too rapid escape or flow of gas through the apparatus will be ordinarily sufficient to produce the necessary back-pressure to maintain the required degree of heat in the dome-chamber for fixing permanently said gases; but a valve or damper may be introduced in the exit-pipe, which may be regulated or controlled by a thermostat.

An apparatus for carrying out the above-described process is illustrated in the accompanying drawing, in which the figure represents a central vertical section of a gas generating and fixing furnace with metal casings for carrying out the process.

A is the furnace structure, which is divided into three compartments, A' A' and A². The chambers A' A' are separated by the partition-wall $a$, which rises to a point about three-fifths the height of the lower portion of said structure, or where the compartment A² begins. Chambers A' A' are provided with suitable grate-bars, $a'$, and with the usual ash-pit and air-tight water-seal below. The lower or larger portion of the structure serves as the fire chamber or chambers, and in its walls are embedded a coil of pipe, through which steam passes to become superheated. Steam enters the coil from pipe $b$, and is expelled beneath the grate-bars $a'$ through conical injectors $b'$. A circular pipe, $c$, situated below the grates, supplies air from a blower to the burning fuel. The pipe is perforated so that the air may be diffused. In the upper portion of the chambers A', I provide the purging-flues B B, which communicate with the boiler-furnace, and when open allow the products of combustion to pass off through the same.

Fuel is supplied to the fire-chambers by means of the passages B' B', which are constructed with suitable covers, and traps at the bottom, so that they may be kept full of coal, and the same heated before being discharged into the furnace as the fire needs replenishing.

The passages from chambers A' A' to chamber A² are provided with sliding plates $d\,d$, to serve as shut-offs. When the fire in either of the furnaces is starting, and before the steam is turned on beneath the grate, the sliding door at the top of that furnace should be closed, and the products of combustion allowed to pass off through B. This construction allows of a continuous generation of hydrogen and carbonic oxide gas, for while one generator is in operation the other is being prepared for a fresh start, or they may be used simultaneously.

The chamber A² is arched at the top, and ends in a small drum or receiver, C, from which leads the eduction-pipe D to the water-seal, purifiers, and holder. The walls of the chamber A² are perforated to receive the hydrocarbon-injectors $f\,f$, pointing toward the center of the chamber. By this arrangement the jets from the injectors impinge against each other and effectually break up and distribute the vapors through the chamber.

A pipe, $g$, surrounds the structure near the top and connects with an oil-tank, from which it is supplied with crude-oil or other hydrocarbon. This pipe is tapped at different points by pipes $g'$, provided with regulating-cocks which supply oil to the injectors. The oil thus supplied is forced into the chamber A² by means of the pressure of the superheated steam, which enters the injectors on the outside through the pipes $h$, said pipes $h$ connecting with a surrounding steam-pipe, $h'$, similar to the oil-pipe above, which is supplied with steam from the superheating-coil around the fire-chambers.

I am aware that the continuous production of water-gas by a regulated simultaneous passage of steam and air through incandescent fuel is not new. I am also aware that water-gas and other gases of low candle-power have been enriched or carbureted by the introduction of hydrocarbon to said gas in a heating or mixing chamber. I therefore do not claim either of these steps or processes alone; but What I do claim, and desire to secure by Letters Patent, is—

1. In the art of continuously manufacturing illuminating-gas, the process herein described, which consists in, first, bringing a body of fuel to incandescence; second, causing the simultaneous currents of superheated steam and of air in relatively regulated volume to pass through said fuel; third, injecting superheated steam and crude petroleum to a chamber with which the water-gas generating-chamber is connected under such pressure and in such regulated quantity or volume as to maintain the temperature in said chamber at about 1600°; fourth, purifying said gas, and conducting it thence to the holder.

2. The process herein described for the manufacture of illuminating-gas, which consists in generating hydrogen and carbonic oxide (water-gas) by first bringing a body of fuel to incandescence in a suitable furnace, permitting the products of combustion to escape, (or utilizing the same as fuel meanwhile;) second, closing the purging-conduit, and at the same time admitting currents of superheated steam and air to the fuel, so regulated in relative volume as to maintain the proper degree of heat and continue combustion; third, passing said gas to a dome or chamber of the furnace; and, fourth, injecting superheated steam and crude petroleum into said dome or chamber in such regulated volume as to maintain the temperature therein at about 1600°, and thereby carburet the gas and bring it to the desired illuminating-power; fifth, passing the resultant through purifiers to the holder.

In testimony whereof I affix my signature in presence of two witnesses.

JNO. W. MITCHELL.

Witnesses:
M. NATHAN,
WM. A. ROSENBAUM.